United States Patent

Huang

[11] Patent Number: 5,694,656
[45] Date of Patent: Dec. 9, 1997

[54] BED POST WITH TWO HORIZONTAL RAILS CONNECTED THERETO

[76] Inventor: Yi-Chen Huang, No. 10, Min-Sheng S. Rd., Hsi Dist., Chia-Yi, Taiwan

[21] Appl. No.: 782,012

[22] Filed: Jan. 7, 1997

[51] Int. Cl.$^6$ .................................................. A47C 19/02
[52] U.S. Cl. ................... 5/290; 5/286; 5/288; 297/440.1; 403/49; 403/258
[58] Field of Search ............................ 5/290, 282.1, 285, 5/286, 288, 291, 295, 296, 299, 300, 304; 297/440.1; 403/49, 258, 173

[56] References Cited

U.S. PATENT DOCUMENTS

| 1,470,015 | 10/1923 | Kusterle | 5/290 |
| 5,522,101 | 6/1996 | Yeh | 5/282.1 |

FOREIGN PATENT DOCUMENTS

| 1071513 | 9/1954 | France | 5/290 |

Primary Examiner—Alexander Grosz
Attorney, Agent, or Firm—Kenyon & Kenyon

[57] ABSTRACT

A piece of furniture includes an upright post, a horizontal rail, and a fastening unit. The upright post is provided with a coupling base having a parallel pair of side walls and a connecting wall that interconnects the side walls and that inclines inwardly and downwardly such that side walls and the connecting wall cooperatively confine a vertical engaging groove which tapers downwardly. The horizontal rail includes an upper rail member and a lower rail member mounted on a bottom side of the upper rail member. The upper rail member is provided with a tongue unit which extends downwardly into the vertical engaging groove. The tongue unit has a parallel pair of flanges confined between the side walls and an inclining wall that interconnects the flanges and that is superimposed on the connecting wall. The lower rail member is provided with a support unit which includes a parallel pair of abutment walls and a vertical wall which interconnects the abutment walls. Each of the abutment walls has an inclining outer edge which abuts against the connecting wall. The upright post, the connecting wall, the inclining wall, and the vertical wall are formed with aligned fastener holes to permit extension of the fastening unit therethrough for fastening the horizontal rail to the upright post.

4 Claims, 3 Drawing Sheets

BED POST WITH TWO HORIZONTAL RAILS CONNECTED THERETO

BACKGROUND OF THE INVENTION

1. Field of the Invention

The present invention relates to a piece of furniture, more particularly to furniture with a relatively firm structure.

2. Description of the Related Art

A conventional piece of furniture includes a plurality of components which are assembled merely by means of screw fasteners. Although the conventional modular furniture is easy to assemble and disassemble, the structure thereof is not quite stable since the screw fasteners might loosen over time. It is desired to provide a piece of furniture which is easy to assemble and disassemble and which has a firmer structure.

SUMMARY OF THE INVENTION

The object of the present invention is to provide a piece of furniture, such as a bed, which is easy to assemble and disassemble and which has a relatively firm structure.

According to a first aspect of the present invention, there is provided a piece of furniture which includes an upright post, a horizontal rail, and a first fastening unit. The upright post is provided with a coupling base having a parallel pair of side walls and a connecting wall that interconnects the side walls and that inclines inwardly and downwardly such that the pair of side walls and the connecting wall cooperatively confine a vertical engaging groove which tapers downwardly. The upright post is formed with a first fastener hole. The connecting wall is formed with a second fastener hole that is aligned with the first fastener hole. The horizontal rail includes an upper rail member and a lower rail member mounted on a bottom side of the upper rail member. The upper rail member is provided with a tongue unit which extends downwardly into the vertical engaging groove of the coupling unit. The tongue unit has a parallel pair of flanges confined between the side walls and an inclining wall that interconnects the flanges and that is superimposed on the connecting wall. The inclining wall is formed with a third fastener hole that is aligned with the first and second fastener holes. The lower rail member is provided with a support unit which includes a parallel pair of abutment walls and a vertical wall which interconnects the abutment walls. Each of the abutment walls has an inclining outer edge which abuts against the connecting wall. The vertical wall is formed with a fourth fastener hole aligned with the first, second and third fastener holes. The first fastening unit extends through the first, second, third and fourth fastener holes so as to fasten the horizontal rail to the upright post.

According to a second aspect of the present invention, there is provided a bed which includes a head post unit with a parallel pair of upright posts, a foot post unit with a parallel pair of upright posts, and a mattress support having a parallel pair of first connecting rails which extend between the head post unit and the foot post unit and which interconnect the upright posts of the head post unit and the upright posts of the foot post unit. The mattress support further has at least one second connecting rail that extends between the first connecting rail and that interconnects the first connecting rails. Each of the upright posts of the head post unit and the foot post unit is provided with a coupling base having a parallel pair of side walls and a connecting wall that interconnects the side walls and that inclines inwardly and downwardly such that the pair of side walls and the connecting wall cooperatively confine a vertical engaging groove which tapers downwardly. Each of the upright posts is formed with a first fastener hole. The connecting wall is formed with a second fastener hole that is aligned with the first fastener hole of a respective one of the upright posts. Each of the first connecting rails includes an upper rail member and a lower rail member mounted on a bottom side of the upper rail member. The upper rail member of each of the first connecting rails is provided with a tongue unit which extends downwardly into the vertical engaging groove of the coupling unit of an adjacent one of the upright posts. The tongue unit has a parallel pair of flanges confined between the side walls of the coupling unit and an inclining wall that interconnects the flanges and that is superimposed on the connecting wall of the coupling unit. The inclining wall is formed with a third fastener hole that is aligned with the first and second fastener holes of the adjacent one of the upright posts. The lower rail member of each of the first connecting rails is provided with a support unit which includes a parallel pair of abutment walls and a vertical wall which interconnects the abutment walls. Each of the abutment walls has an inclining outer edge which abuts against the connecting wall of the coupling unit of an adjacent one of the upright posts. The vertical wall is formed with a fourth fastener hole aligned with the third fastener hole of the tongue unit of the upper rail member. The bed further comprises first fastening units, each of which extends through the first and second fastener holes of one of the upright posts and through the third and fourth fastener holes of the adjacent one of the first connecting rails so as to fasten the first connecting rails to the upright posts of the head post unit and the foot post unit.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
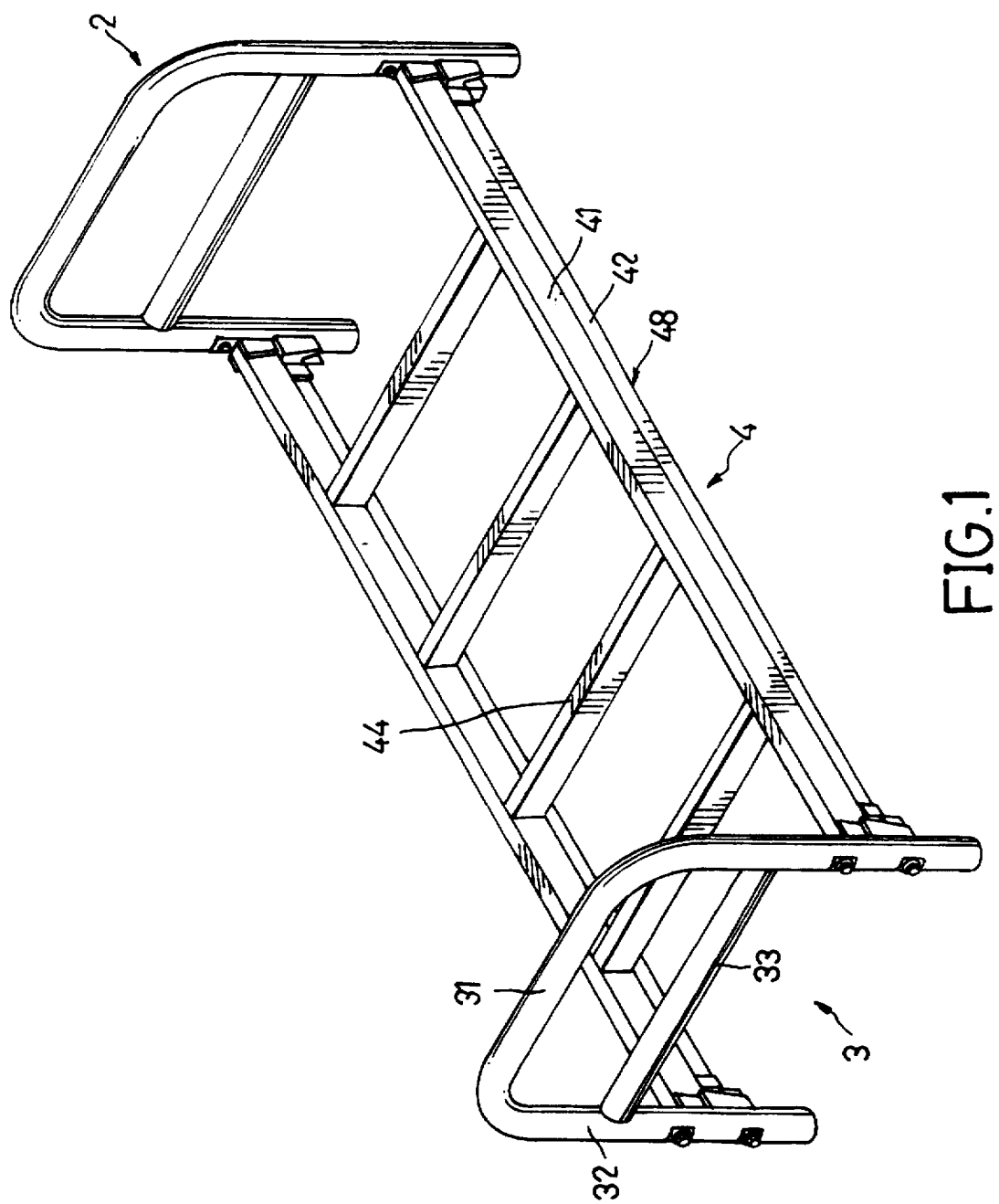
FIG. 1 is a perspective view illustrating a preferred embodiment of the present invention.

As shown in FIG. 1, the furniture according to a preferred embodiment of the present invention is embodied in a bed which includes a head post unit 2, a foot post unit 3, and a mattress support 4. Each of the head post unit 2 and the foot post unit 3 has an inverted U-shaped structure and includes a parallel pair of upright posts 32, a horizontal top bar 31 interconnecting top ends of the upright posts 32, and a horizontal reinforcing bar 33 extending between the upright posts 32. The mattress support 4 has a parallel pair of first connecting rails 48 which extend between the head post unit 2 and the foot post unit 3 and which interconnect the upright posts 32 of the head post unit 2 and the upright posts 32 of the foot post unit 3. The mattress support 4 further has at least one second connecting rail 44 that extends between the first connecting rails 48 and that is transverse to the first connecting rails 48. Each of the first connecting rails 48 includes an upper rail member 41 and a lower rail member 42.

Figure 2:
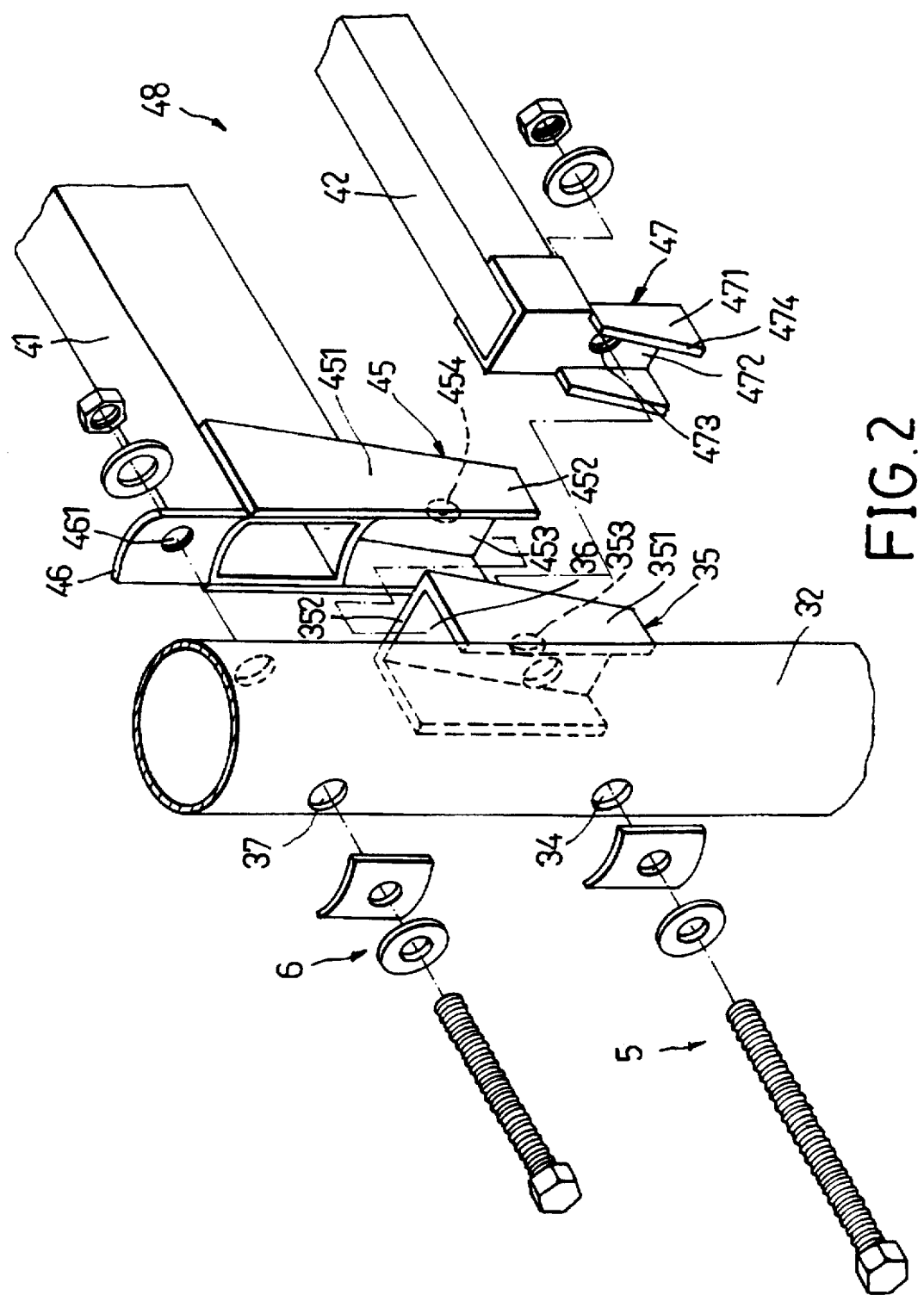
FIG. 2 is an exploded perspective view illustrating the connection between an upright post, an upper rail member and a lower rail member of the preferred embodiment.
Figure 3:
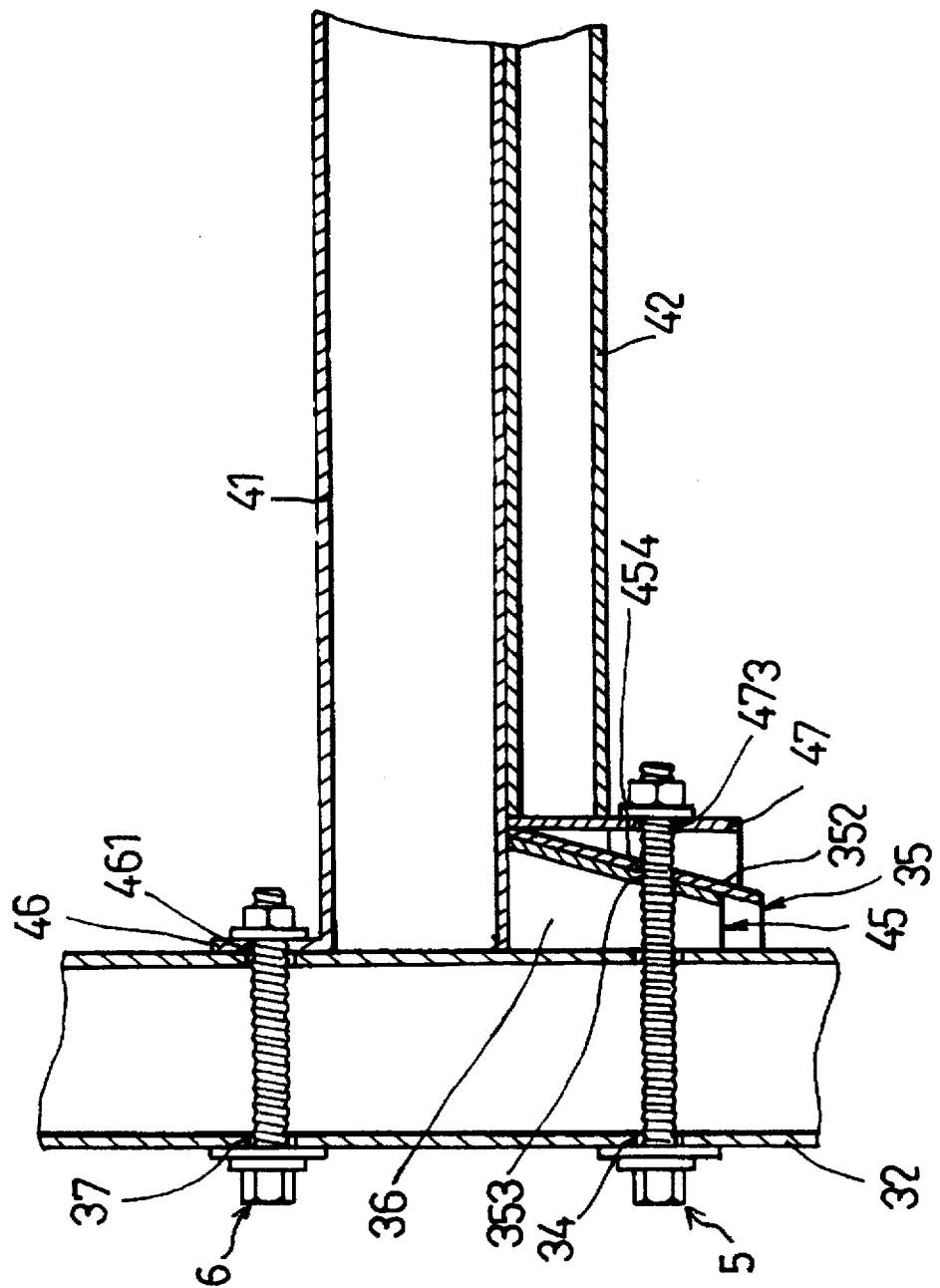
FIG. 3 is a cross-sectional view illustrating the connection of FIG. 2.

The connection between one of the upright posts 32 of the head post unit 2 and the foot post unit 3 and an adjacent one of the first connecting rails 48 is illustrated in FIGS. 2 and 3. Referring to FIGS. 2 and 3, the upright post 32 is provided with a coupling base 35 having a parallel pair of side walls 351 and a connecting wall 352 that interconnects the side walls 351 and that inclines inwardly and downwardly such that the pair of side walls 351 and the connecting wall 352 cooperatively confine a vertical engaging groove 36 which tapers downwardly. The upright post 32 is formed with a first fastener hole 34. The connecting wall 352 is formed with a second fastener hole 353 that is aligned with the first fastener hole 34.

The upper rail member 41 of the first connecting rail 48 is provided with a tongue unit 45 which extends downwardly into the vertical engaging groove 36 of the coupling unit 35 of the adjacent upright post 32. The tongue unit 45 has a parallel pair of flanges 451 which are confined between the side wall 351 of the coupling unit 35 and an inclining wall 453 that interconnects the flanges 451 and that is superimposed on the connecting wall 352 of the coupling unit 35. The inclining wall 453 is formed with a third fastener hole 454 that is aligned with the first and second fastener holes 34, 353 of the adjacent upright post 32.

The lower rail member 42 of the first connecting rail 48 is provided with a support unit 47 which includes a parallel pair of abutment walls 471 and a vertical wall 472 which interconnects the abutment walls 471. Each of the abutment walls 471 has an inclining outer edge 474 which abuts against the connecting wall 352 of the coupling unit 35 of the adjacent upright post 32. The vertical wall 472 is formed with a fourth fastener hole 473 aligned with the third fastener hole 454 of the tongue unit 45 of the upper rail member 41.

The bed further comprises two pairs of first fastening units 5, each of which extends through the first and second fastener holes 34, 353 of the upright posts 32 and through the third and fourth through holes 454, 473 of the adjacent upper and lower rail members 41, 42 so as to fasten the first connecting rails 48 to the upright posts 32 of the head post unit 2 and the foot post unit 3.

In this embodiment, each of the upright posts 32 has a circular cross-section. The upper rail member 41 is further provided with an extension 46 which extends upwardly. The extension 46 has a curvature that conforms with a periphery of the adjacent upright post 32 so as to be in close contact with the upright post 32. The extension 46 is formed with a fifth fastener hole 461. Each of the upright posts 32 is formed with a sixth fastener hole 37 aligned with the fifth fastener hole 461 in the extension 46 of the adjacent upper rail member 41. The bed further includes two pairs of second fastening units 6, each of which extends through the sixth fastener hole 37 of one of the upright posts 32 and through the fifth fastener hole 461 in the extension 46 of the adjacent upper rail member 41.

To assemble the bed of this invention, the upper rail members 41 of the first connecting rails 48 are brought between the head post unit 2 and the foot post unit 3. The tongue units 45 of the upper rails 41 are respectively inserted into the vertical engaging grooves 36 of the coupling units 35 of the upright posts 32 of the head post unit 2 and the foot post unit 3 so that the third fastener hole 454 of each of the tongue units 45 is aligned with the first and second fastener holes 34, 353 of the adjacent upright post 32 and so that the fifth fastener hole 461 of each of the extensions 46 is aligned with the sixth fastener hole 37 of the adjacent upright post 32. After that, the lower rail members 42 are respectively brought to the bottom side of the upper rail members 41 so that the inclining outer edges 474 of the abutment walls 471 of each of the support units 47 abut against the connecting wall 352 of the coupling unit 35 of the adjacent upright post 32 and so that the fourth through hole 473 of each of the support units 47 is aligned with the third through hole 454 of the adjacent upper rail member 41. Each of the first fastening units 5 is passed through the first and second fastener holes 34, 353 of one of the upright posts 32 and the third and fourth fastener holes 454, 472 of the adjacent first connecting rail 48 so as to fasten the upper and lower rail members 41, 42 of the first connecting rails 48 to the upright posts 32 of the head post unit 2 and the foot post unit 3. Each of the second fastening units 6 is passed through the sixth through holes 37 of one of the upright posts 32 and the fifth fastener hole 461 in the extension 46 of the adjacent upper rail member 41 so as to fasten the extensions 46 of the upper rail members 41 to the upright posts 32.

With the use of the present invention, wherein each of the first connecting rails 48 includes an upper rail member 41 and a lower rail member 42, a better strength is imparted to the bed so as to prevent deformation of the bed over a period of use. Both the vertical engaging grooves 36 of the coupling unit 35 and the tongue units 45 taper downwardly, so that a better coupling effect can be achieved. The abutment walls 471 of the support units 47 abut against the coupling units 35 and thus help to support the coupling units 35. Moreover, since each of the first fastening units 5 extend through the first, second, third, and fourth fastener holes, a bed with a firmer structure as compared to the conventional ones can be obtained.

The furniture of the present invention is embodied in a bed in the preferred embodiment. However, the present invention can also be applied to other furnitures, such as a table or a chair that includes an upright post and a horizontal rail mounted on the upright post.

With this invention thus explained, it is apparent that numerous modifications and variations can be made without departing from the scope and spirit of this invention. It is therefore intended that this invention be limited only as indicated in the appended claims.

I claim:

1. A furniture comprising:
   an upright post provided with a coupling base having a parallel pair of side walls and a connecting wall that interconnects said side walls and that inclines inwardly and downwardly such that said pair of side walls and said connecting wall cooperatively confine a vertical engaging groove which tapers downwardly, said upright post being formed with a first fastener hole, said connecting wall being formed with a second fastener hole that is aligned with said first fastener hole;
   a horizontal rail which includes an upper rail member and a lower rail member mounted on a bottom side of said upper rail member, said upper rail member being provided with a tongue unit which extends downwardly into said vertical engaging groove of said coupling unit, said tongue unit having a parallel pair of flanges confined between said side walls and an inclining wall that interconnects said flanges and that is superimposed on said connecting wall, said inclining wall being formed with a third fastener hole that is aligned with said first and second fastener holes, said lower rail member being provided with a support unit which includes a parallel pair of abutment walls and a vertical wall which interconnects said abutment walls, each of said abutment walls having an inclining outer edge which abuts against said connecting wall, said vertical wall being formed with a fourth fastener hole aligned with said first, second and third fastener holes; and a first fastening unit which extends through said first, second, third and fourth fastener holes so as to fasten said horizontal rail to said upright post.

2. The furniture according to claim 1, wherein said upper rail member is further provided with an extension which is in close contact with said upright post, said extension being formed with a fifth fastener hole, said upright post being formed with a sixth fastener hole aligned with said fifth fastener hole, said furniture further comprising a second fastening unit which extends through said fifth and sixth fastener holes so as to fasten said extension to said upright post.

3. A bed including a head post unit with a parallel pair of upright posts, a foot post unit with a parallel pair of upright posts, and a mattress support having a parallel pair of first connecting rails which extend between said head post unit and said foot post unit and which interconnect said upright posts of said head post unit and said upright posts of said foot post unit, said mattress support further having at least one second connecting rail that extends between said first connecting rails and that interconnects said first connecting rails, wherein:

each of said upright posts of said head post unit and said foot post unit is provided with a coupling base having a parallel pair of side walls and a connecting wall that interconnects said side walls and that inclines inwardly and downwardly such that said pair of side walls and said connecting wall cooperatively confine a vertical engaging groove which tapers downwardly, each of said upright posts being formed with a first fastener hole, said connecting wall being formed with a second fastener hole that is aligned with said first fastener hole of a respective one of said upright posts;

each of said first connecting rails including an upper rail member and a lower rail member mounted on a bottom side of said upper rail member, said upper rail member of each of said first connecting rails being provided with a tongue unit which extends downwardly into said vertical engaging groove of said coupling unit of an adjacent one of said upright posts, said tongue unit having a parallel pair of flanges confined between said side walls of said coupling unit and an inclining wall that interconnects said flanges and that is superimposed on said connecting wall of said coupling unit, said inclining wall being formed with a third fastener hole that is aligned with said first and second fastener holes of the adjacent one of said upright posts;

said lower rail member of each of said first connecting rails being provided with a support unit which includes a parallel pair of abutment walls and a vertical wall which interconnects said abutment walls, each of said abutment walls having an inclining outer edge which abuts against said connecting wall of said coupling unit of an adjacent one of said upright posts, said vertical wall being formed with a fourth fastener hole aligned with said third fastener hole of said tongue unit of said upper rail member;

said bed further comprising first fastening units, each of which extends through said first and second fastener holes of one of said upright posts and through said third and fourth fastener holes of the adjacent one of said first connecting rails so as to fasten said first connecting rails to said upright posts of said head post unit and said foot post unit.

4. The bed according to claim 3, wherein said upper rail member of each of said first connecting rails is further provided with an extension which is in close contact with the adjacent one of said upright posts, said extension being formed with a fifth fastener hole, each of said upright posts being formed with a sixth fastener hole aligned with said fifth fastener hole of the adjacent one of said first connecting rails, said bed further comprising second fastening units, each of which extends through said fifth and said sixth fastener holes in one of said first connecting rails and in the adjacent one of said upright posts so as to fasten said extensions of said upper rail members to said upright posts.

* * * * *